July 17, 1951  G. H. BECKLEY  2,561,168
CAR TOP TRAILER

Filed April 15, 1947  3 Sheets-Sheet 1

INVENTOR.
GEORGE H. BECKLEY
BY *Victor J. Evans & Co.*
ATTORNEYS

July 17, 1951  G. H. BECKLEY  2,561,168
CAR TOP TRAILER

Filed April 15, 1947  3 Sheets-Sheet 2

INVENTOR.
GEORGE H. BECKLEY
BY Victor J. Evans & Co.
ATTORNEYS

July 17, 1951  G. H. BECKLEY  2,561,168
CAR TOP TRAILER
Filed April 15, 1947  3 Sheets-Sheet 3
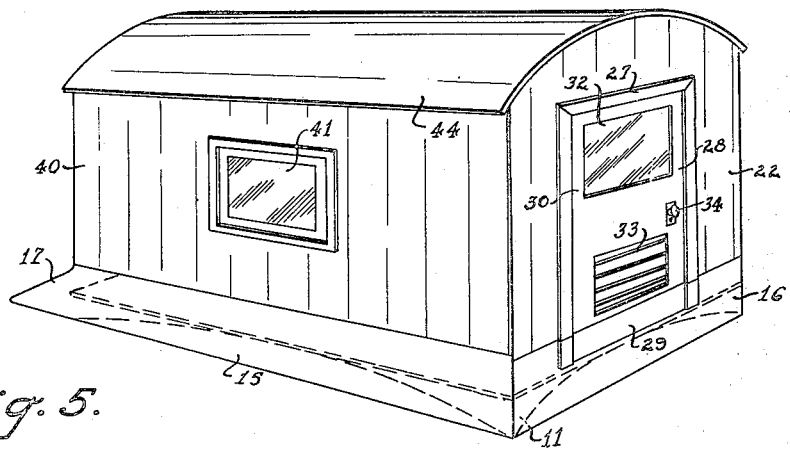
Fig. 5.
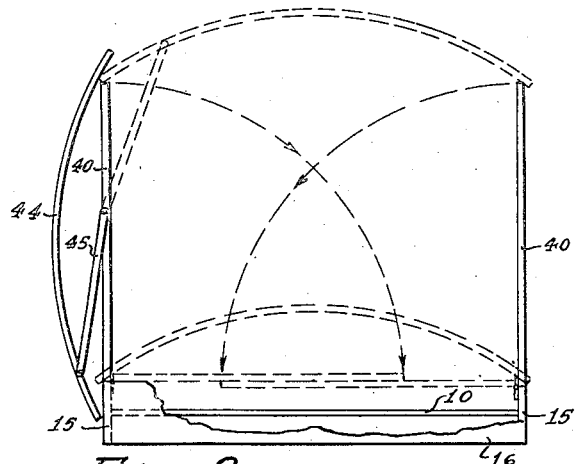
Fig. 6.
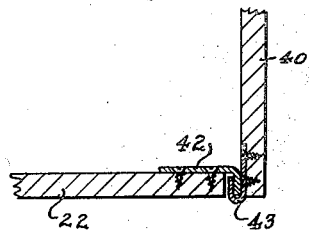
Fig. 7.
Fig. 8.
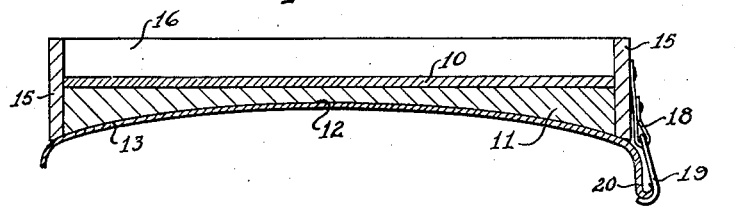
INVENTOR.
GEORGE H. BECKLEY
BY Victor J. Evans & Co.
ATTORNEYS Patented July 17, 1951

2,561,168

UNITED STATES PATENT OFFICE 2,561,168

CAR TOP TRAILER

George Howell Beckley, Madison, Ind.

Application April 15, 1947, Serial No. 741,532

1 Claim. (Cl. 20—2)

This invention relates to a car top trailer unit, which is especially designed to be installed on the top of any wheeled vehicle.

An object of the invention is to provide a one room enclosure that is light in weight, durable, safe, secure, comfortable, and always accessible when desired, where one or more persons may eat or sleep inexpensively, without any trouble or inconvenience.

The unit eliminates all cumbersome accessories, with unhampered maneuverability of the vehicle when parking or driving, not having the added weight or space necessary with the conventional house trailers.

With the above and other objects and advantages in view, the invention consists of the novel details of construction, arrangement and combination of parts more fully hereinafter described, claimed and illustrated in the accompanying drawings in which:

Figure 5 is a perspective view of a modified form of the invention;

Figure 6 is a diagrammatic view of the method of folding the form shown in Figure 5;

Figure 7 is a fragmentary sectional view of the corner joint and

Figure 8 is a transverse sectional view of the frame in position on a vehicle top.

Figure 1:
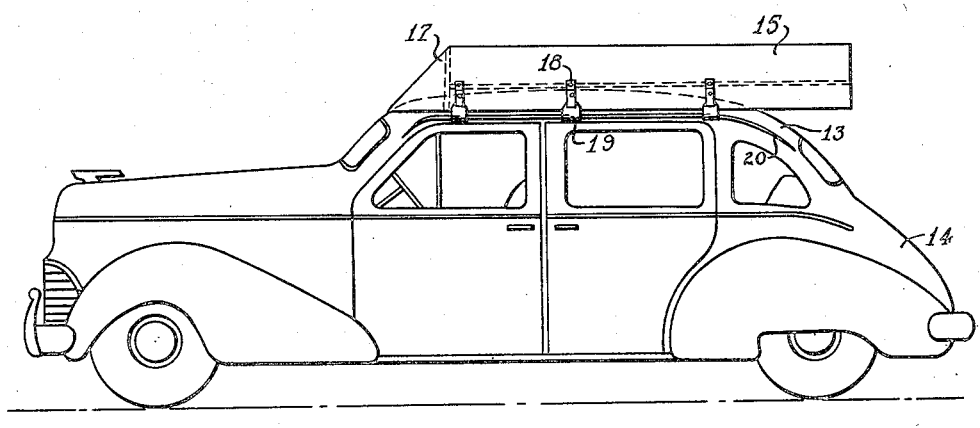
Figure 1 is a side elevational view of a vehicle with an embodiment of the invention attached thereto in collapsed or travel position.

Referring more in detail to the drawings, the attachment comprises a rectangular, square, or otherwise flat rigid floor 10 which is mounted on a base 11 having the upper surface thereof conforming to the floor surface 10, and the undersurface 12 thereof contoured to fit the top or roof 13 of a vehicle 14.

The floor 10 has secured thereto, the sides 15 and ends 16 forming a box-like enclosure.

The outside surfaces of the sides and ends may be flat or curved to form a more streamline effect in continuing the design of the vehicle, and the sides extend forwardly of the front end of the box-like structure as at 17 to streamline the front of the box, as are the sides and ends.

The base 11 may be made of rubber or a rubber composition or any similar material to protect the top of the vehicle, and the sides extend downwardly to cover the base and engage the top 13, and are provided with straps 18 having hook members 19 thereon which engage the rain gutters 20 of the vehicle to retain the box-like structure in fixed relation to the top 13.

Figure 2:
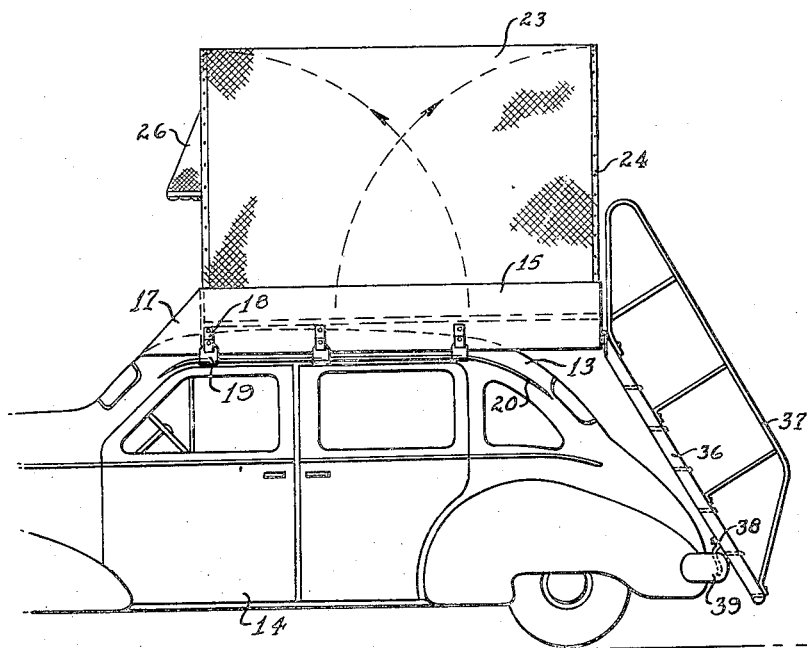
Figure 2 is the same, with the embodiment of the invention in erected position, ready for occupancy.
Figure 3:
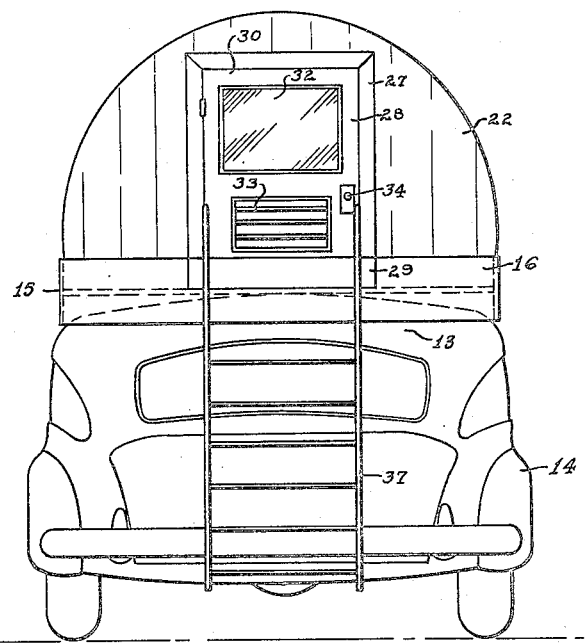
Figure 3 is an end view of the attachment in erected position.
Figure 4:
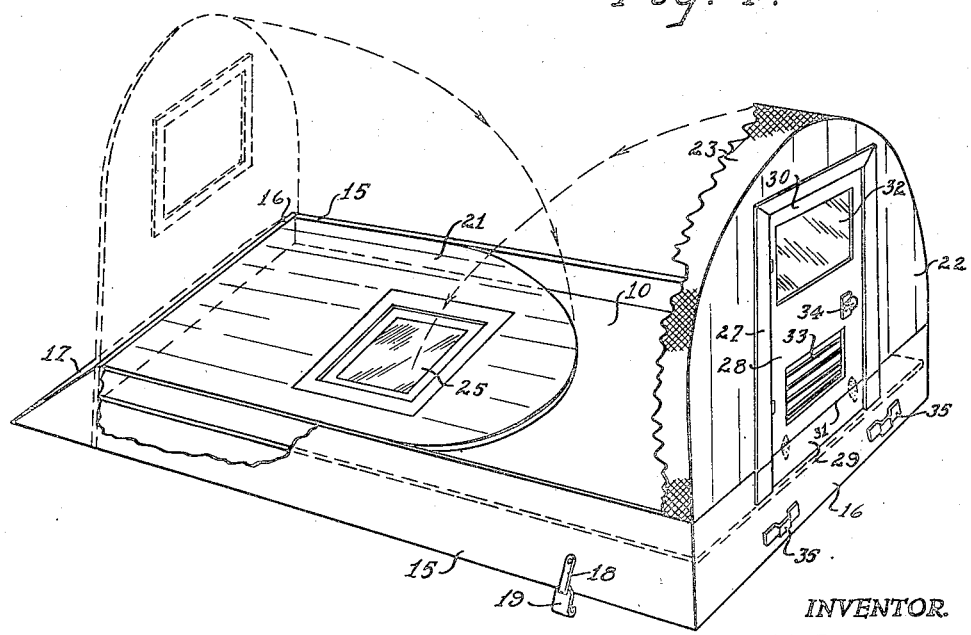
Figure 4 is a perspective view partly broken away, to show the method of folding the attachment.

In Figures 1 to 4 inclusive, end walls 21 and 22 are hinged to the ends 16 so that the lower edge of the walls and the upper edge of the ends are in abutting relation to each other to prevent rain from entering the meeting edges thereof. The end walls 21 and 22 are approximately semicircular in shape, and have a canvas covering 23 secured to the outer edge thereof in any conventional manner, as shown at 24. The end wall 21 is provided with a window 25, which may be provided with an awning 26, and the end wall 22 is provided with a door frame 27 carrying the hinged door 28. The door has a lower section 29 which is hinged to the upper section 30 at 31 so that when the attachment is erected as shown in Figures 2 and 3, both sections will open together, but in collapsed position. The lower section will stay in position in the end 16 to complete the end. The space provided by the sides and ends will not only receive the end walls and canvas, but will also give space for carrying the necessary articles to complete the interior of the attachment when erected.

The door 28 is provided with a pane of glass 32 for visibility, a grill or louver 33 for ventilation and a conventional knob actuated lock 34. Ladder hooks 35 are provided on the rear end 16 to receive and support the upper end of the ladder 36 having the hand rails 37 and hooks 38 on the ladder engage the bumper 39 of the vehicle to hold the ladder in the position shown in Figure 2 so that access can be obtained to the attachment.

The unit previously described may be lengthened, and braces secured to the bumper 39 may be used to support the outer end of the box-like structure. The rails of the ladder are foldable, so that a flat compact ladder is obtained that may be easily carried in the attachment.

In Figures 5 to 8 inclusive, the box-like structure is as previously described, as are the end walls, and the door and the related parts. However, in this form of the invention, side walls 40 are hinged to the sides 15 in like manner as the end walls are hinged to the ends, and the side walls are provided with windows 41 and the end walls conform to the side walls and are provided with tongue members 42 entering keeper members 43 on the side walls to retain the walls in vertical position.

A curved top 44, which conforms to the shape of the upper edge of the end walls, is pivotally mounted on one of the side walls 40 by a link or arm 45 so that it can be easily swung into position to form a roof for the attachment, there being a link 45 secured at each end of the roof.

In folding the attachment, as shown in Figure 6, it will be obvious that the sides and ends must be of different heights to make a compact fold, and the side walls may be made to fold first, or the end walls may be made to fold first. The side walls and end walls will therefore be of uneven heights, so that the upper edges of all walls are in alinement with each other to receive the roof 44, the variance in height being compensated for by the variance in height of the sides and ends.

There has thus been provided a compact attachment which, when erected, will form a one room enclosure and it is believed that the construction and the operation thereof will be understood by those skilled in the art.

It is also to be understood that changes in the minor details of construction, arrangement and combination of parts may be resorted to, provided they fall within the spirit of the invention and the scope of the appended claim.

Having thus described the invention, what is claimed as new and desired to be secured by Letters Patent is:

In a collapsible enclosure for motor vehicles, the combination which comprises a box like enclosure having sides and ends a flat base providing a floor secured to the inner surface of the sides and ends of the box like enclosure above the lower marginal edge thereof, a floor supporting member having a flat upper floor contacting surface and a concave lower surface for nesting on the upper surface of a motor vehicle top secured to said base within said box like enclosure, depending latch elements carried by the sides of the box like enclosure and positioned to grip the gutters on the sides of a vehicle body for retaining the said box like enclosure on the said vehicle body, a rear end panel having a door therein hinged to one end of the box like enclosure, a forward end panel having a window therein hinged to the opposite end of the said box like enclosure, upwardly extended side panels hinged to the upper edges of the sides of the box like enclosure, and an arcuate cover connected by a link to one of said side panels whereby the said cover folds to a position beside the side panel to which it is connected and also to an operative position extended over the upper edges of the side panels and covering the said floor and end panels.

GEORGE HOWELL BECKLEY.

REFERENCES CITED

The following references are of record in the file of this patent:

UNITED STATES PATENTS

| Number | Name | Date |
|---|---|---|
| 410,783 | Chadd | Sept. 10, 1889 |
| 1,292,468 | Hominuke | Jan. 28, 1919 |
| 1,984,681 | Jackson | Dec. 18, 1934 |
| 2,119,051 | LeBoeuf | May 31, 1938 |
| 2,335,708 | Strobel | Nov. 30, 1943 |
| 2,409,946 | MacLeod | Oct. 22, 1946 |